United States Patent
Lim et al.

(10) Patent No.: US 11,074,487 B1
(45) Date of Patent: Jul. 27, 2021

(54) METHODS, APPARATUSES, AND SYSTEMS FOR MEDIA CALIBRATION FOR PRINTERS

(71) Applicant: Datamax-O'Neil Corporation, Altamonte Springs, FL (US)

(72) Inventors: Heng Yew Lim, Singapore (SG); Ying Cao, Singapore (SG); Phek Thong Lee, Singapore (SG); Cheng Khoon Ng, Singapore (SG); WenWei Zhang, Singapore (SG)

(73) Assignee: DATAMAX-O'NEIL CORPORATION, Altamonte Springs, FL (US)

( * ) Notice: Subject to any disclaimer, the term of this patent is extended or adjusted under 35 U.S.C. 154(b) by 0 days.

(21) Appl. No.: 16/792,356

(22) Filed: Feb. 17, 2020

(51) Int. Cl.
  *G06K 15/02* (2006.01)

(52) U.S. Cl.
  CPC ................. *G06K 15/024* (2013.01)

(58) Field of Classification Search
  None
  See application file for complete search history.

(56) References Cited

U.S. PATENT DOCUMENTS

| 5,564,841 A | 10/1996 | Austin et al. |
| 9,481,186 B2 | 11/2016 | Bouverie et al. |
| 10,250,768 B2 | 4/2019 | Conlon et al. |
| 2011/0292435 A1 | 12/2011 | Cok et al. |
| 2013/0016368 A1* | 1/2013 | Bouverie ................. B41J 17/36 358/1.6 |
| 2017/0344861 A1* | 11/2017 | Shirasaka ................. B41J 5/32 |
| 2020/0145546 A1* | 5/2020 | Alaganchetty ....... G06K 15/024 |

* cited by examiner

*Primary Examiner* — Lennin R Rodriguezgonzalez
(74) *Attorney, Agent, or Firm* — Alston & Bird LLP

(57) ABSTRACT

Printers capable of determining a media type of a media and associated methods are provided. An example method includes scanning a media with a verifier associated with the printer to generate at least two consecutive windows of the media. The example method further includes determining a vertical length of a captured image based on a comparison of image characteristic values captured in the at least two consecutive windows. The example method further includes determining a media characteristic associated with the media based at least on the captured image and the vertical length and one or more stored media profiles. The example method further includes calibrating the printer based on the media characteristic.

20 Claims, 12 Drawing Sheets

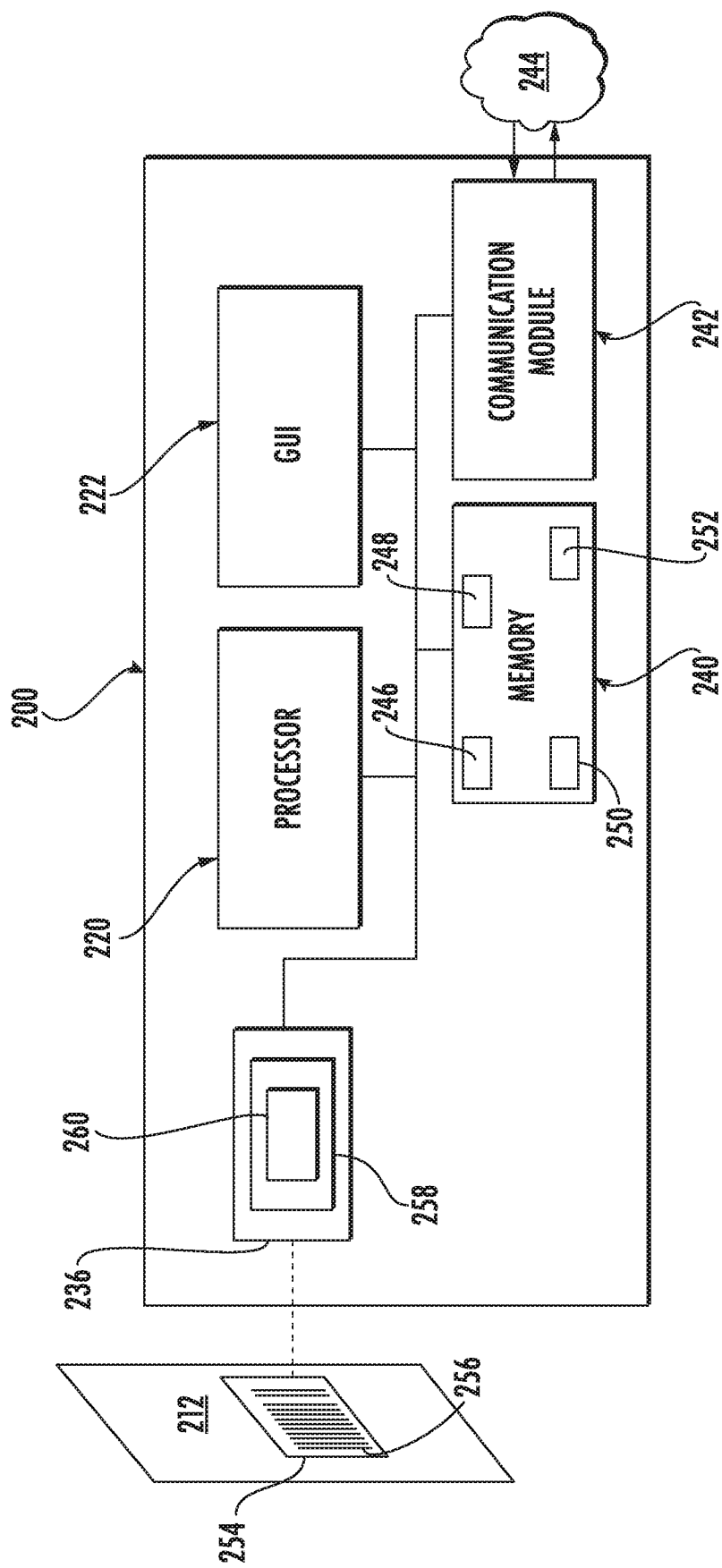

US 11,074,487 B1

METHODS, APPARATUSES, AND SYSTEMS FOR MEDIA CALIBRATION FOR PRINTERS

BACKGROUND

Notwithstanding the revolution in digital communications and digital transmission/viewing of documents, hardcopy printed media—printing onto tangible sheets of paper or labels—remains essential for many purposes. Hardcopy printing may be accomplished via multiple types of devices, including thermal printers, inkjet printing, and laser printers. In this regard, Applicant has identified many deficiencies and problems associated with many printers. Through applied effort, ingenuity, and innovation, many of these identified problems have been solved by developing solutions that are included in embodiments of the present disclosure, many examples of which are described in detail herein.

BRIEF SUMMARY

Accordingly, in one aspect, the present system and method may employ a verifier that includes a line scanner, which, in an embodiment, may be integrated within the printer itself. In some embodiments, a method for determining a media type of a media associated with a printer may be provided. In some embodiments, the method comprises: scanning a media with a verifier associated with the printer to generate at least two consecutive windows of a media; determining a vertical length of a captured image based on a comparison of image characteristic values captured in the at least two consecutive windows; determining a media characteristic associated with the media based at least on the captured image and the vertical length and one or more stored media profiles; and calibrating the printer based on the media characteristic.

In some embodiments, the method further comprises receiving one or more media profiles each associated with a media type. The media characteristic includes a media type. In some embodiments, a line scanner sensor associated with a line scanner physically moves in a vertical direction during the scanning.

In some embodiments, the scanning is associated with a pre-determined window size defined by a horizontal width and a vertical length. In some embodiments, the media characteristic further includes a width. In some embodiments, the method further comprises: generating one or more image characteristic value graphs based on the captured image; detecting one or more changes of image characteristic value on the one or more image characteristic value graphs; for each image characteristic value graph: determining a first point and a second point based one or more changes of image characteristic values; determining a pulse width based on the distance between the first point and the second point; and determining the width based on the one or more pulse widths associated with each of the image characteristic value graphs.

In some embodiments, the media physically moves in a vertical direction during the scanning. In some embodiments, the captured image comprises one or more pre-defined vertical sample lines associated with a line scanner sensor associated with the line scanner. In some embodiments, one media profile of the one or more media profiles is associated with a gap media type. In some embodiments, determining that the media is associated with the gap media type comprises: generating one or more image characteristic value graphs associated with each of the one or more sample lines; detecting one or more decreases of image characteristic values in the one or more image characteristic value graphs that exceeds a gap threshold; and determining that the media is associated with the gap media type.

In some embodiments, one media profile of the one or more media profiles is associated with a continuous media type. In some embodiments, determining that the media is associated with the continuous media type comprises: generating one or more image characteristic value graphs associated with each of the one or more sample lines; detecting that one or more image characteristic values in the one or more image characteristic value graphs do not increase or decrease by more than a continuous threshold; and determining that the media is associated with the continuous media type. In some embodiments, one media profile of the one or more media profiles is associated with a blackmark media type. In some embodiments, determining that the media is associated with the blackmark media type comprises: generating one or more image characteristic value graphs associated with each of the one or more sample lines; detecting that at least one image characteristic value in the one or more image characteristic value graphs increase or decrease by more than a blackmark darkness threshold for more than a blackmark size threshold; and determining that the media is associated with the blackmark media type.

In some embodiments, the calibrating comprises adjusting a label stop position.

In some embodiments, a printer is provided. The printer comprises a line scanner configured to scan a media to generate at least two consecutive windows of a media; and a device configured to: determine a vertical length of a captured image based on a comparison of image characteristic values captured in the at least two consecutive windows; determine a media characteristic associated with the media based at least on the captured image, the vertical length, and the one or more media profiles; and calibrate the printer based on the media characteristic.

In some embodiments, the device is further configured to receive one or more media profiles each associated with a media type. In some embodiments, the media characteristic includes a media type.

In some embodiments, the media physically moves in a vertical direction during the scanning. In some embodiments, the scanning is associated with a pre-determined window size defined by a horizontal width and a vertical length and the media characteristic further includes a width. In some embodiments, the device is further configured to: generate one or more image characteristic value graphs based on the captured image; detect one or more changes of image characteristic value on the one or more image characteristic value graphs; for each image characteristic value graph: determine a first point and a second point based one or more changes of image characteristic values; determine a pulse width based on the distance between the first point and the second point; and determine the width based on the one or more pulse widths associated with each of the image characteristic value graphs.

In some embodiments, a line scanner sensor associated with the line scanner physically moves in a vertical direction during the scanning. In some embodiments, the captured image comprises two overlapping windows each associated with the pre-determined window size. In some embodiments, the captured image comprises one or more pre-defined vertical sample lines associated with the line scanner sensor.

In some embodiments, one media profile of the one or more media profiles is associated with a gap media type. In some embodiments, determining that the media is associated with the gap media type comprises: generating one or more image characteristic value graphs associated with each of the one or more sample lines; detecting one or more decreases of image characteristic values in the one or more image characteristic value graphs that exceeds a gap threshold; and determining that the media is associated with the gap media type. In some embodiments, one media profile of the one or more media profiles is associated with a continuous media type. In some embodiments, determining that the media is associated with the continuous media type comprises: generating one or more image characteristic value graphs associated with each of the one or more sample lines; detecting that one or more image characteristic values in the one or more image characteristic value graphs do not increase or decrease by more than a continuous threshold; and determining that the media is associated with the continuous media type.

In some embodiments, one media profile of the one or more media profiles is associated with a blackmark media type. In some embodiments, determining that the media is associated with the blackmark media type comprises: generating one or more image characteristic value graphs associated with each of the one or more sample lines; detecting that at least one image characteristic value in the one or more image characteristic value graphs increase or decrease by more than a blackmark darkness threshold for more than a blackmark size threshold; and determining that the media is associated with the blackmark media type. In some embodiments, the calibrating comprises adjusting a label stop position.

The foregoing illustrative summary, as well as other exemplary objectives and/or advantages of the present disclosure, and the manner in which the same are accomplished, are further explained within the following detailed description and its accompanying drawings.

BRIEF DESCRIPTION OF THE DRAWINGS

FIG. 2B schematically depicts a block diagram of the printer-verifier of FIG. 2A, according to various embodiments of the present disclosure;

DETAILED DESCRIPTION OF THE INVENTION

Figure 1:
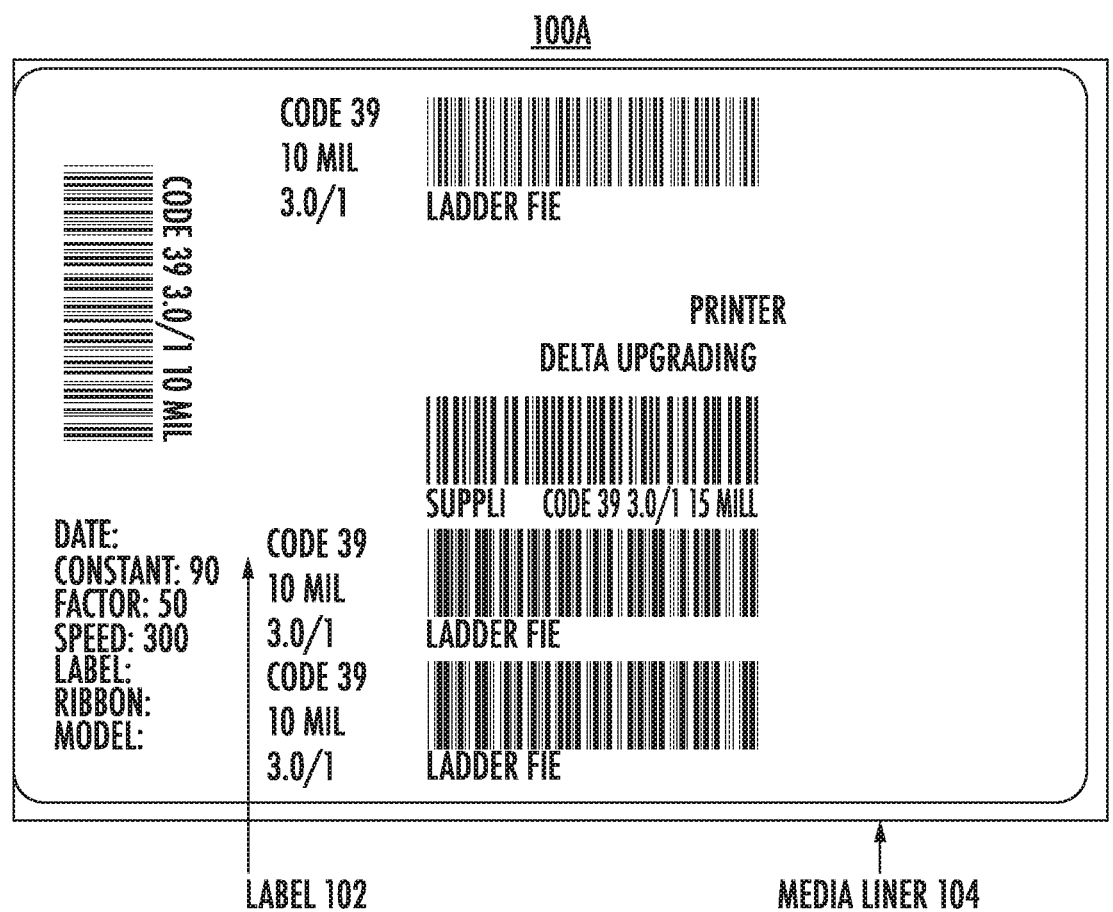
FIG. 1 illustrates an exemplary print media, according to various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Unless the context requires otherwise, throughout the specification and claims which follow, the word "comprise" and variations thereof, such as, "comprises" and comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The word example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

Various embodiments of the present disclosure will be described in relation to a thermal transfer printer. However, the present disclosure may be equally applicable to other types and styles of printers (inclusive of printer-verifiers) (e.g., a thermal printer, a laser printer, an ink drop printer, etc.).

The headings provided herein are for convenience only and do not limit the scope or meaning of the claimed disclosure.

I. Definitions and Overview

Media calibration refers to detecting media types, such as, continuous, gap, and blackmark media and media size (e.g., length and width) so as to enable a printer to accurately print at or near a media edge. In some examples, printers may conduct media calibration by using light sensors and reading analog values of the light sensors to detect a difference in light and determine whether the difference is significant enough to be indicative of a gap between media or a mark on the media. In this example, the result is highly dependent on the sensitivity of the light receiving sensors and the power of the light transmitting sensor. Therefore, such printers may have a higher likelihood for false detection of media type when, for example, the media contains pre-printed information, abnormalities, and/or the like.

Various example embodiments of the present disclosure provide systems and methods that may be utilized by a printer to determine media characteristics. In some examples, the systems and methods disclosed herein rely on a mechanism for capturing an image of the media, such as by utilizing, for example, a verifier (e.g., a line scanner), a scanner, and/or the like. In some examples, patterns of a scanned image may be identified and/or otherwise processed to determine the media type and width/length of the media, which may assist the printing process. Indeed, and in some examples, reliance on a verifier may allow the printer to advantageously, in some examples, detect the width of the media.

The terms "print media," "physical print media," "paper," and "labels" refer to tangible, substantially durable physical material onto which text, graphics or images may be imprinted and persistently retained over time.

In some examples, physical print media may be used for personal communications, business communications, and/or to convey prose expression (including news, editorials, product data, academic writings, memos, and many other kinds of communications), data, advertising, fiction, entertainment content, and illustrations and pictures.

Physical print media may generally be derivatives of wood pulp or polymers, and includes conventional office paper, clear or tinted acetate media, news print, envelopes, mailing labels, product labels, and other kinds of labels. Thicker materials, such as cardstock or cardboard, may be included as well. More generally, print media may be used to receive ink, dye, or toner, or is a media whose color or shading can be selectively varied (for example, through selective application of heat, light, or chemicals) to create a persistent visual contrast (in black and white, shades of gray, and/or colors) that can be perceived by the human eye as text, images, shapes, symbols, or graphics.

In exemplary embodiments discussed throughout the present disclosure, reference may be made specifically to "paper" or "labels;" however, the operations, system elements, and methods of such exemplary applications may be applicable to media other than or in addition to the specifically mentioned "paper" or "labels."

A "printer" may refer to a device which imprints text, images, shapes, symbols, graphics, and/or the like onto print media to create a persistent, human-readable representation of the text, images, shapes, symbols, or graphics. Printers may include, for example, laser printers, light-emitting diode (LED) printers, inkjet printers, thermal printers, dot matrix printers, impact printers, and line printers.

Generally, printers are designed so that one or more sheets of paper, one or more labels, or other print media can be inserted or "fed" into the printer. For example, multiple sheets or other media can be inserted into a holding tray or other container element of the printer for temporary storage. In alternative or additional embodiments, individual sheets of print media may be hand-fed into a printer one at a time.

Command and content instructions are then sent to the printer electronically, for example, from an external computer that is communicatively linked to the printer. The printer feeds a sheet of paper, or a label, or other print media into itself and towards a printhead within the printer. The printhead of the printer then imprint the appropriate contents onto the print media.

Figure 2A:
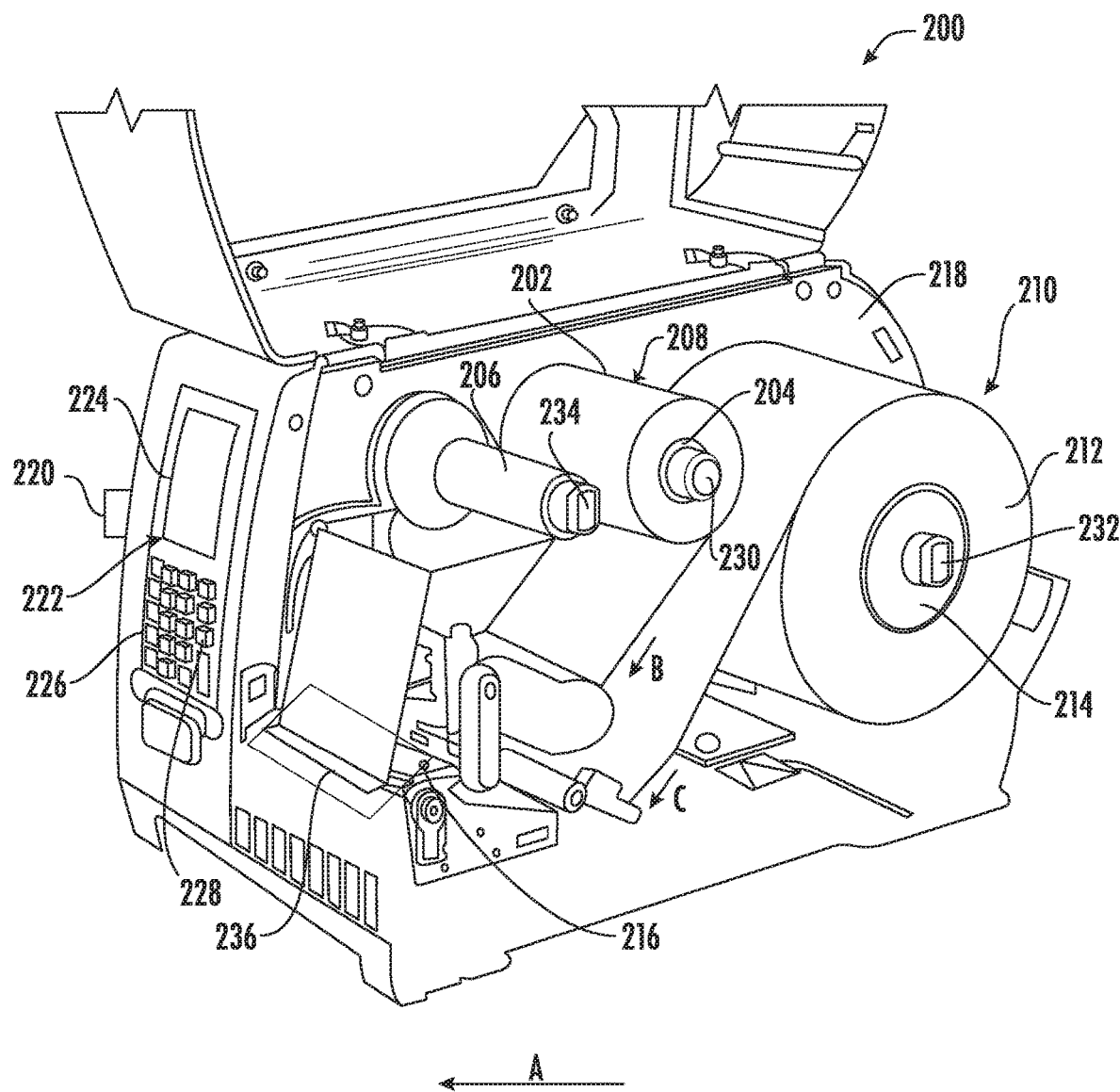
FIG. 2A graphically illustrates a portion of an exemplary printer-verifier (a cover of the printer-verifier removed) to illustrate an interior thereof, according to various embodiments of the present disclosure.
Figure 3:
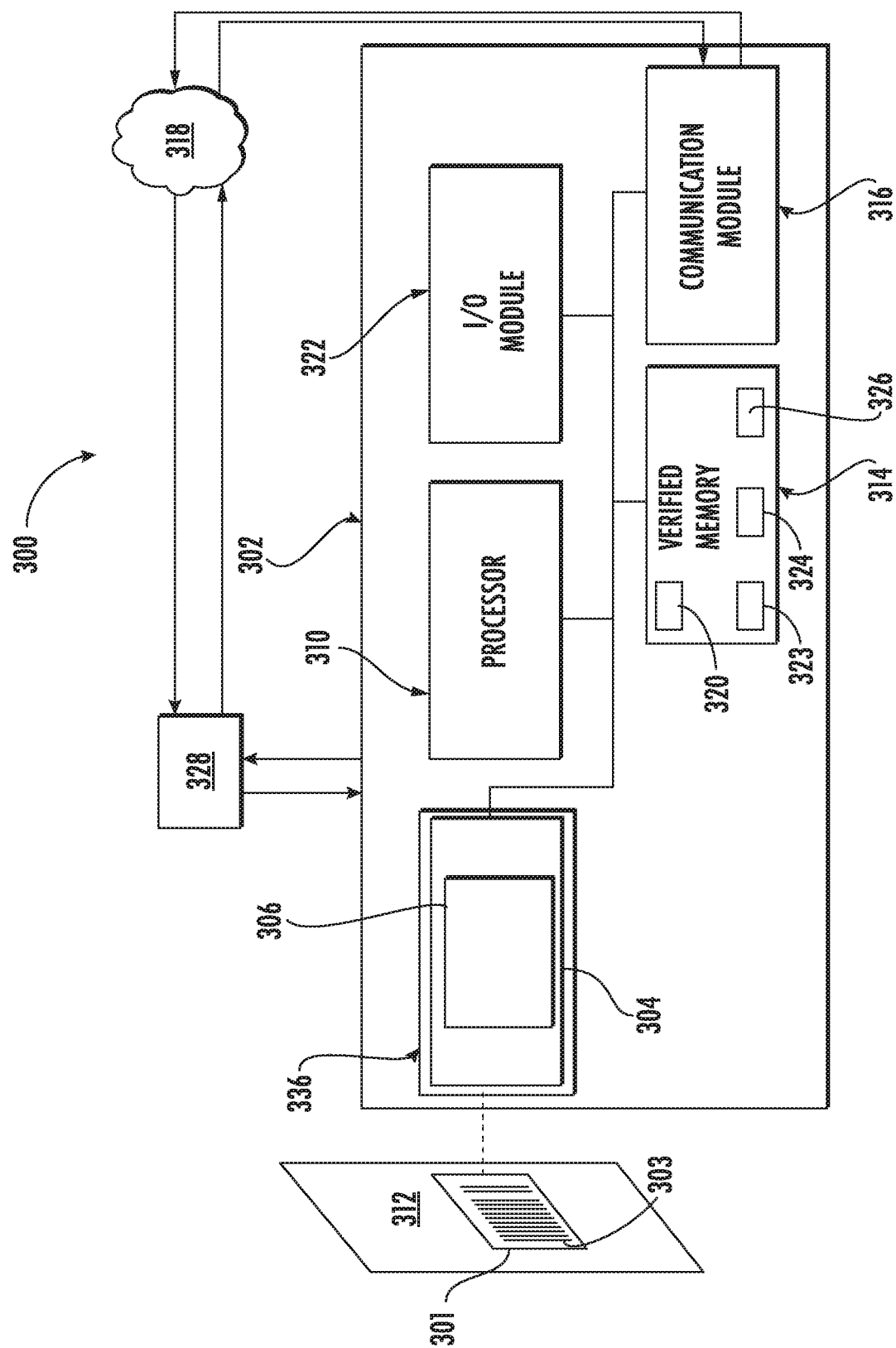
FIG. 3 schematically depicts an exemplary printer communicatively coupled to a verifier in a system for printing an image, according to various embodiments of the present disclosure.

Further, the term "printer" refers to both a printer-verifier (in which a printer and verifier are integrated in a single device) such as exemplified in FIGS. 2A-2B and a separate printer as exemplified in FIG. 3. As depicted in FIG. 3, and hereinafter described, the separate printer 328 may be communicatively coupled to a verifier 302 in a system 300 for printing an image and verifying a print quality of the image. The verifier 302 may be attached to the printer 328 or may be a standalone device to where the user brings the print media from the printer for determining media characteristics.

As depicted in FIGS. 2A-2B, printer-verifier 200 may be configured for, scanning the media to determine media characteristics, printing the image, and/or verifying a print quality of the image printed on print medium, as hereinafter described. Additionally or alternatively, printer-verifier 200 may be configured for printing the image, and a verifier may be configured for verifying the print quality of the image printed on print medium. As used herein, the "image" may be text, a line, a box, a symbol, a barcode, optical character recognition (OCR) text, etc.

In some instances, the print media (for example, paper or labels), when first fed or loaded into the printer, may be "pre-printed media," which may have at least one pre-printed document element such as preprinted text, markings, or logos. In other words, prior to a current print operation, there can be prior information on the print media that has been imprinted by some prior print process employing a prior printer, and is referred to as containing "pre-printed document element", "pre-printed information", or "pre-printed content."

In some example embodiments and based on the media calibration described herein, the printer-verifier 200 may enable correct horizontal positioning or vertical positioning of a printed image on a print medium. The term "correct horizontal positioning" means that the printed image is automatically and consistently printed as intended, such as within the boundaries of a print area of the print medium or at the center of the print medium, etc., depending on preference. Various embodiments enable positioning the image to be printed properly with regard to the horizontal or vertical edges of the print medium, such that the printing is reliably and consistently in horizontal or vertical register. Various embodiments enable the horizontal position to be fixed automatically for each print medium in real-time without user interaction.

As used herein, "horizontal direction" refers to the weft direction perpendicular to the movement of the print media and parallel to the printhead. As used herein, the term "vertical direction" refers to the direction parallel with the movement of the print media.

As used herein, "media characteristic" refers to information regarding a media that can be determined by analyzing image characteristic values obtained from a line scanner scanning the media. Examples of media characteristic include media type, gap or blackmark size, media horizontal width, media vertical length, or the like.

As used herein, the term "image characteristic values" refers to one or more values associated with an image that represent lightness, darkness, or color information such as grayscale values, values of color value scales, or other applicable values that may represent lightness, darkness, or color information in an image. Image characteristic values may be stored in an image characteristic profile.

As used herein, "media type" refers to pre-defined categorization of media, such as gap, continuous, or blackmark media. As used herein, "media profile" refers to a bitmap image characteristic profile associated with a media type to be compared with samples of a captured image of the media. For example, a gap media type defines at least one gap threshold and defines that if one or more image characteristic values associated with one or more sampled lines decrease by an amount that exceeds a threshold, a media associated with the one or more image characteristic values are determined to be gap media type. In another example, a continuous media profile defines at least one continuous threshold and defines that if one or more image characteristic values associated with one or more sampled lines do not increase or decrease by an amount that exceeds a threshold, a media associated with the one or more image characteristic values are determined to be continuous media type. In another example, a blackmark media profile defines at least one blackmark darkness threshold and a black mark size threshold and defines that if one or more image characteristic value graphs increase or decrease by more than the blackmark darkness threshold for more than a blackmark size threshold, a media associated with the one or more image characteristic values are determined to be blackmark media type. In some embodiments, the media profile and one or more thresholds defined in the media profile may be pre-defined. Alternatively or additionally, a processor may generate a media profile in real-time and/or in semi-real time.

FIG. 1 illustrates some elements of example media 100A. The media 100A includes label 102 and media liner 104. The media 100A may further include printed document elements such as text (in any known alphabet), numbers, mathematical or musical symbols, geometric forms, shapes, and symbols, and icons. As can be seen in FIG. 1, the printed content is printed at or near the edge of the label. As is described herein, the disclosed methods and systems enable continuous media calibration so as to enable the printer to accurately print at or near the edges of the label.

II. Example Apparatus for Implementing Embodiments of the Present Disclosure

Embodiments of the present disclosure may be implemented as apparatus and systems for determining media characteristics and calibrating the printer based on the determined characteristics.

The present system and method are applicable to different kinds of printers, including but not limited to laser printers, LED printers, inkjet printers, thermal printers, dot matrix printers, and others. For convenience, an exemplary laser printer is illustrated and discussed in some exemplary embodiments below, and these embodiments can be employed on other kinds of printers as well.

A. Printer and Printer with Verifier/Scanner

Referring now to FIGS. 2A-2B, an exemplary printer-verifier 200 capable of printing on print media 212 is partially shown. The depicted printer-verifier 200 of FIG. 2A has a body 218 for enclosing an interior thereof. The printer-verifier 200 further comprises a power source and a moveable cover for accessing the interior and any components therein.

In various embodiments, the printer-verifier 200 is a thermal transfer printer-verifier that includes a ribbon supply spindle 230 contained within the body 218. A ribbon supply roll 208 is configured to be disposed on the ribbon supply spindle 230. The ribbon supply roll 208 comprises ink ribbon 202 wound on a ribbon supply spool 204. The ink ribbon supplies the media (e.g., ink) that transfers onto the print media. The printer-verifier 200 may further comprise a thermal printhead 216 utilized to thermally transfer a portion of ink from the ink ribbon 202 to the print media 212 as the ink ribbon is unwound from the ribbon supply spool 204 along a ribbon path (arrow B in FIG. 2A), and the print media 212 is unwound from a media supply spool 214 along a media path (arrow C in FIG. 2A).

A media supply roll 210 comprises the print media 212 wound on the media supply spool 214. A media supply spindle 232 on which the media supply roll 210 is configured to be disposed is contained within the body 218. In some embodiments, the print media 212 may be pre-printed media that may include at least one pre-printed document element such as preprinted text, markings, or logos. ribbon rewind spindle 234 on which unwound ribbon is wound up may also be contained within the body 218. A ribbon take-up 206 may be disposed on the ribbon rewind spindle 234, although the ribbon take-up 206 on the ribbon rewind spindle 234 may not be necessary.

The printer-verifier 200 may further comprise one or more motors for rotating the ribbon supply spindle 230 and the ribbon supply roll 208 disposed thereon (if present) in a forward (arrow A in FIG. 2A) or a backward rotational direction (dependent on the ink surface), for rotating the media supply roll 210 disposed on the media supply spindle 232 in a forward rotational direction, and for rotating the ribbon rewind spindle 234. In a thermal direct printer-verifier, the ribbon supply spool, the ribbon rewind spool, and the ribbon may be eliminated and a thermally sensitive paper replaces the print media. These components are also included in a printer-verifier 200 as hereinafter described.

The printer-verifier 200 may include a GUI 222 for communication between a user and the printer-verifier 200. The GUI 222 may be communicatively coupled to the other components of the printer-verifier for displaying visual and/or auditory information and receiving information from the user (e.g., typed, touched, spoken, etc.). As depicted in FIG. 2A, the body 218 of the printer-verifier 200 may include the GUI 222 with, for example, a display 224 and a keypad 226 with function buttons 228 that may be configured to perform various typical printing functions (e.g., cancel print job, advance print media, and the like) or be programmable for the execution of macros containing preset printing parameters for a particular type of print media. The graphical user interface (GUI) 222 may be supplemented or replaced by other forms of data entry or printer control, such as a separate data entry and control module linked wirelessly or by a data cable operationally coupled to a computer, a router, or the like. The GUI 222 may be operationally/communicatively coupled to a processor (CPU) 220 for controlling the operation of the printer-verifier 200, in addition to other functions. In some embodiments, the user interface may be different from the one depicted in FIG. 2A. In some embodiments, there may not be a user interface.

Referring now to FIG. 2B, an example block diagram of the printer-verifier 200 is shown. The printer-verifier 200 may comprise the processor 220, a memory 240 communicatively coupled to the processor 220, and a power source.

The printer may further comprise a communications module 242 communicatively coupled to one or more of the other printer components.

The central processing unit (CPU) (i.e., the processor 220) is the electronic circuitry within a computer that carries out the instructions of a computer program by performing the basic arithmetic, logical, control and input/output (I/O) operations specified by the instructions as hereinafter described. The printer-verifier 200 may be communicatively connected using the communications module 242 to a computer or a network 244 via a wired or wireless data link. In a wireless configuration, the communications module 242 may communicate with a host device over the network 244 via a variety of communication protocols (e.g., WI-FI® BLUETOOTH®), CDMA, TDMA, or GSM). In accordance with various embodiments of the present disclosure, the memory 240 is configured to store a media type determination program 246, a media profile 248, an offset value 250, and a drifting offset value 252 as hereinafter described.

Still referring to FIGS. 2A and 2B, an imaging circuitry 236 is disposed in the printer-verifier 200 and is configured to capture a representation of the print media (e.g., barcode 254 on print medium 212 within pre-defined window 256), using a line scanner 258 (i.e., the imaging circuitry 236 comprises the line scanner 258) to obtain a captured image. The line scanner 258 comprises one or more line scanner sensors 260 for scanning an image. The line scanner 258 scans the print medium 212 as the line scanner 258 and print medium 212 are in relative motion with each other. Electronic signals from the photo sensors are used to create one or more images, such as grayscale or colored images.

The processor 220 is further configured to determine if the captured image conforms to the media profile 248 by generating one or more image characteristic value graphs based on the captured image and analyzing the one or more image characteristic value graphs using thresholds defined in the media profile.

Referring now to FIG. 3, an example printer 328 communicatively coupled to verifier 302 in system 300 for printing an image is shown. Printer 328 may be similar to the printer-verifier 200 depicted in FIGS. 2A-2B, except that the imaging circuitry of the verifier is separated from the printer in system 300. In this regard, printer 328 has a body for enclosing an interior thereof. The printer 328 further comprises a power source and a moveable cover for accessing the interior. Similar to the printer-verifier 200 described above in connection with FIGS. 2A-2B, the printer 328 may comprise a ribbon supply spindle contained within the body. A ribbon supply roll is configured to be disposed on the ribbon supply spindle. The ribbon supply roll ink ribbon wound on a ribbon supply spool. The ink ribbon supplies the media (e.g., ink) that transfers onto the print media.

Similar to the printer-verifier 200 described above in connection with FIGS. 2A-2B, the printer 328 may further comprise a thermal printhead utilized to thermally transfer a portion of ink from the ink ribbon to the print media, as the ink ribbon unwinding from the ribbon supply spool along a ribbon path and the print media unwinding from a media supply spool along a media path. In some embodiments, the print media may be pre-printed media that may have at least one pre-printed document element such as preprinted text, markings, or logos. A media supply roll comprises the print media wound on the media supply spool. A media supply spindle (on which the media supply roll is configured to be disposed) is contained within the body. A ribbon rewind spindle on which unwound ribbon is wound up may also be contained within the body. A ribbon take-up may be disposed on the ribbon rewind spindle, although the ribbon take-up on the ribbon rewind spindle may not be necessary.

The printer 328 may further comprise one or more motors for rotating the ribbon supply spindle and the ribbon supply roll disposed thereon (if present) in a forward or a backward rotational direction (dependent on the ink surface), for rotating the media supply roll disposed on the media supply spindle in a forward rotational direction, and for rotating the ribbon rewind spindle. In a direct transfer printer-verifier, the ribbon supply spool, the ribbon rewind spool, and the ribbon may be eliminated and a thermally sensitive paper substituted for the print media.

Similar to the printer-verifier 200 described above in connection with FIGS. 2A-2B, the printer 328 may further comprise a processor, a memory communicatively coupled to the processor, and a power source. The printer may further comprise a communications module communicatively coupled to one or more of the other printer components. The printer 328 may have a fewer or greater number of components as hereinafter described.

The verifier 302 comprises imaging circuitry 336, a memory (a verifier memory 314) communicatively coupled to the imaging circuitry 336 and a central processing unit (CPU) (herein a "verifier processor" 310) communicatively coupled to the verifier memory 314 and imaging circuitry 336. The verifier 302 may further comprise an I/O module 322 and a verifier communication module 316.

The subsystems in the verifier 302 of FIG. 3 are electrically connected via a coupler (e.g., wires, traces, etc.) to form an interconnection subsystem. The interconnection system may include power buses or lines, data buses, instruction buses, address buses, etc., that allow operation of the modules/subsystems and the interaction there between. The I/O module 322 may include a verifier graphical user interface. In various embodiments, the verifier 302 may be communicatively connected using the verifier communication module 316 to the computer or the network 318 via a wired or wireless data link. In a wireless configuration for the wireless data link, the verifier communication module 316 may communicate with a host device, such as the computer, or the network 318, via a variety of communication protocols (e.g., WI-FI®, BLUETOOTH®, NEC®, RFID®), CDMA, TDMA, or GSM). The verifier memory 314 may store a media type determination program 320, the media profile 323, the offset 324, and the drifting offset 326.

While FIG. 3 depicts a verifier memory 314 and a verifier processor 310 in the verifier 302, it is to be understood that only the printer 328 or only the verifier 302, or both the printer 328 and verifier 302 communicatively coupled thereto may comprise the memory and the processor for executing the steps as hereinafter described (i.e., at least one of the verifier and the printer comprises a memory communicatively coupled to the imaging circuitry and a processor communicatively coupled to the imaging circuitry and memory). The verifier 302 that is attached to the printer may rely on the memory and the processor of printer for executing the steps as hereinafter described while the verifier 302 that is a standalone device has its own verifier memory 314 and verifier processor 310 for executing the steps as hereinafter described. Additionally, or alternatively, the printer may rely on the verifier memory 314 and the verifier processor 310 of verifier 302 attached to the printer for executing the steps as hereinafter described.

The imaging circuitry 336 disposed in verifier 302 is configured to capture a representation of the print, using a line scanner (i.e., the imaging circuitry 236 comprises the line scanner) to obtain a captured image. The line scanner comprises one or more line scanner sensors for scanning an image. The line scanner scans the print medium 312 as the line scanner and print medium 312 are in relative motion with each other. Electronic signals from the line scanner sensors may be used to create grayscale or colored image.

While a thermal transfer printer-verifier and printer are described, it is to be understood that various embodiments of the present disclosure may be used in other types of printers (e.g., ink-drop printer, laser-toner printer, etc.). It is also to be understood that the print media can be supplied from other than a media supply spindle (e.g., in a "fan-fold" configuration).

B. Printer With A Line Scanner

Figure 4:
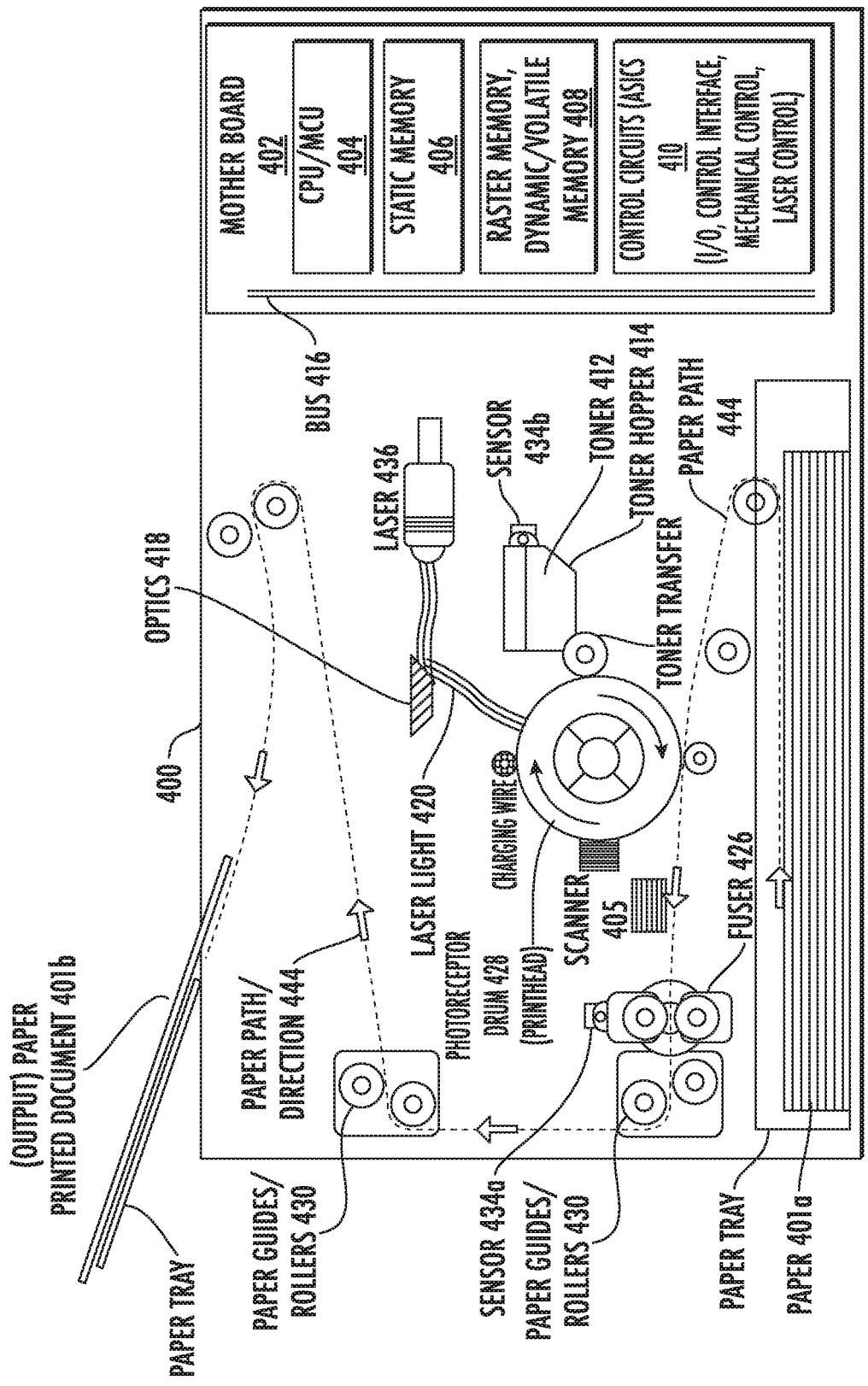
FIG. 4 is a cross-sectional schematic view of some internal operating elements of an exemplary printer, according to various embodiments of the present disclosure.

FIG. 4 illustrates some elements of an exemplary printer 400 in a cross-sectional, schematic view. While FIG. 4 illustrates a laser printer, it is noted that thermal printers and thermal printheads may also be utilized in conjunction with embodiments of the disclosure.

Printer 400 employs a laser 436 (for example, a semiconductor laser) to project laser light 420 onto an electrically charged, rotating cylindrical photoreceptor drum 428 (also referred to a "printhead 428"). The laser light 420 is suitably modulated (via printer electronics, discussed below) in accordance with a rasterized image (and/or rasterized text) on a source document page.

Photoconductivity on the photoreceptor drum 428 allows the charged electrons to fall away from the areas exposed to light. Powdered ink (toner) 412 particles are then electrostatically attracted to the charged areas of the photoreceptor drum 428 that have not been laser-beamed. Print media 401a, such as paper or other print media (such as acetate or labels, etc.), is passed through printer 400 by mechanical feed elements, such as paper guides/rollers 430. The print media 401a is transferred along paper path/direction 444. Along path/direction 444, the print media 401a makes contact with the photoreceptor drum 428. The photoreceptor drum 428 then transfers the image onto print media 401a by direct contact. Finally the paper or other print media 401a is passed onto a fuser 426, which uses intense heat to instantly fuse the toner/image onto the paper. The result is printed document 401b, which is imprinted with the durable, persistent image of the original raster-scanned page view.

Exemplary printer 400 may employ other elements as well. One or more motors and other electromechanical mechanisms are typically employed for purposes such as rotating the polygonal mirror which may be part of optics 418; driving the paper guides/rollers 430 which propel print media 401a through the printer: rotating photoreceptor drum 428 and other rotary-elements; and generally effectuating transfer of print media 401a and materials within printer 400.

A variety of internal sensors may also be present in printer 400. For example, sensor 434a may monitor the temperature and/or pressure of fuser 426. Sensor 434b may monitor the amount of toner 412 left in toner hopper 414. Other sensors may monitor paper movement, the amount of electric charge on various elements, the rotary speed of various rotating elements, and other aspects of operations of printer 400. Some elements of printer 400 may have built-in sensors. Sensors are useful for monitoring the operational status of printer 400, and for identifying and reporting operational problems or errors.

A motherboard 402 typically holds and interconnects various microchips used to control and monitor printer 400. Motherboard 402 may include, for example and without limitation, a central processing unit (CPU) or MCU 404, static memory 406, raster memory, dynamic/volatile memory 408, control circuits (ASICs) 410, and system bus 416.

A central processing unit (CPU) (or microcontroller unit (MCU)) 404 provides overall operational control of printer 400. This includes monitoring printer operations via sensors 434a and 434b, and directing printer operations via various application specific integrated circuits (ASICs) 410 discussed further below.

Static memory 406 may store non-volatile operational code (such as internal device drivers) for printer 400. CPU/MCU 404 may employ the code stored in static memory 406 in order to maintain the operational control of printer 400.

Volatile printer raster memory 408, such as dynamic RAM (DRAM), may be used to store data received from external computers, such as page descriptions, raster images, and other data pertinent to the printing of particular documents.

Control of printer 400 may be maintained in various ways. In some embodiments, CPU/MCU 404 of printer 400 may directly control various elements of the printer (such as motors and other mechanical servers, etc.). In other instances, control may be effectuated by CPU/MCU 404 via various Application Specific Integrated Circuits (ASICs) 410, which act as intermediary control circuits 410.

Control circuits 410 may support such functions as external input/output (for example, via USB ports, an Ethernet port, or wireless communications): a control interface for a user control panel or wireless remote on the outside of the printer; mechanical control of motors and other electromechanical elements; and control of laser 436. In some embodiments of the printer 400, some or all control circuits 410 may not be on motherboard 402, and may instead by integrated directly in laser 436, fuser 426, toner hopper 414, and into various other electromechanical elements of printer 400.

A system bus 416 may serve to transfer data and messages between elements of motherboard 402, and between motherboard 402 and various other microchips, controllers, and sensors 434a and 434b of printer 400.

In various embodiments of the present disclosure, different printers 400 may implement these steps described above in distinct ways, and some elements may be referred to by other terms or generic terms. For example, the elements directly responsible for printing onto the print media 401a may be referred to generically as the printhead 428. In exemplary printer 400, either the photoreceptor drum 428 alone, or possibly the photoreceptor drum 428 in combination with fuser 426, may be thought of as the printhead 428. As another example, LED printers use a linear array of light-emitting diodes to "write" the light on the drum, and the array of light-emitting diodes may be referred to as the printhead 428. As another example, a thermal printer uses a heat-emitting element as the printhead 428.

In various embodiments of a printer 400, the toner 412 is based on either wax or plastic, so that when the paper passes through the fuser 426, the particles of toner melt. The fuser 426 can be an infrared oven, a heated pressure roller, or (on some very fast, expensive printers) a xenon flash lamp. The warm-up process that a laser printer goes through when power is initially applied to the printer consists mainly of heating the fuser element.

In various embodiments of a printer 400, a scanner 405 that includes a line scanner may be included in the printer 400. As may be appreciated from FIG. 4, the scanner 405 may be structurally situated within printer 400 so that the scanner 405 may scan print media 401a when the paper has not yet been imprinted by printer 400. The scanner 405 may include one or more line scanner sensors. During scanning, one or more of the line scanner sensors or the printed media 401A may be physically moving. In some embodiments, the scanner 405 is positioned along paper path/direction 444 so as to be before or after the photoreceptor drum or printhead 428 along paper path/direction 444. In any case, the scanner 405 may scan the print media 401*a* before printing.

As described above, various embodiments of the present disclosure may be employed in a thermal printer. A thermal printer may have many elements in common with the exemplary printer-verifier 200 of FIGS. 2A-2B, printer 328 of FIG. 3, printer 400 of FIG. 4, including (for example and without limitation) a paper tray or paper trays, paper guides/rollers, a scanner, a motherboard with a variety of appropriate microchips, and other elements. Some of these elements may be arranged or configured differently for a thermal printer as compared to a laser printer. A thermal printer also has a printhead, but the printhead of a thermal printer may be distinctive in design from the printhead of a laser printer.

Figure 5:
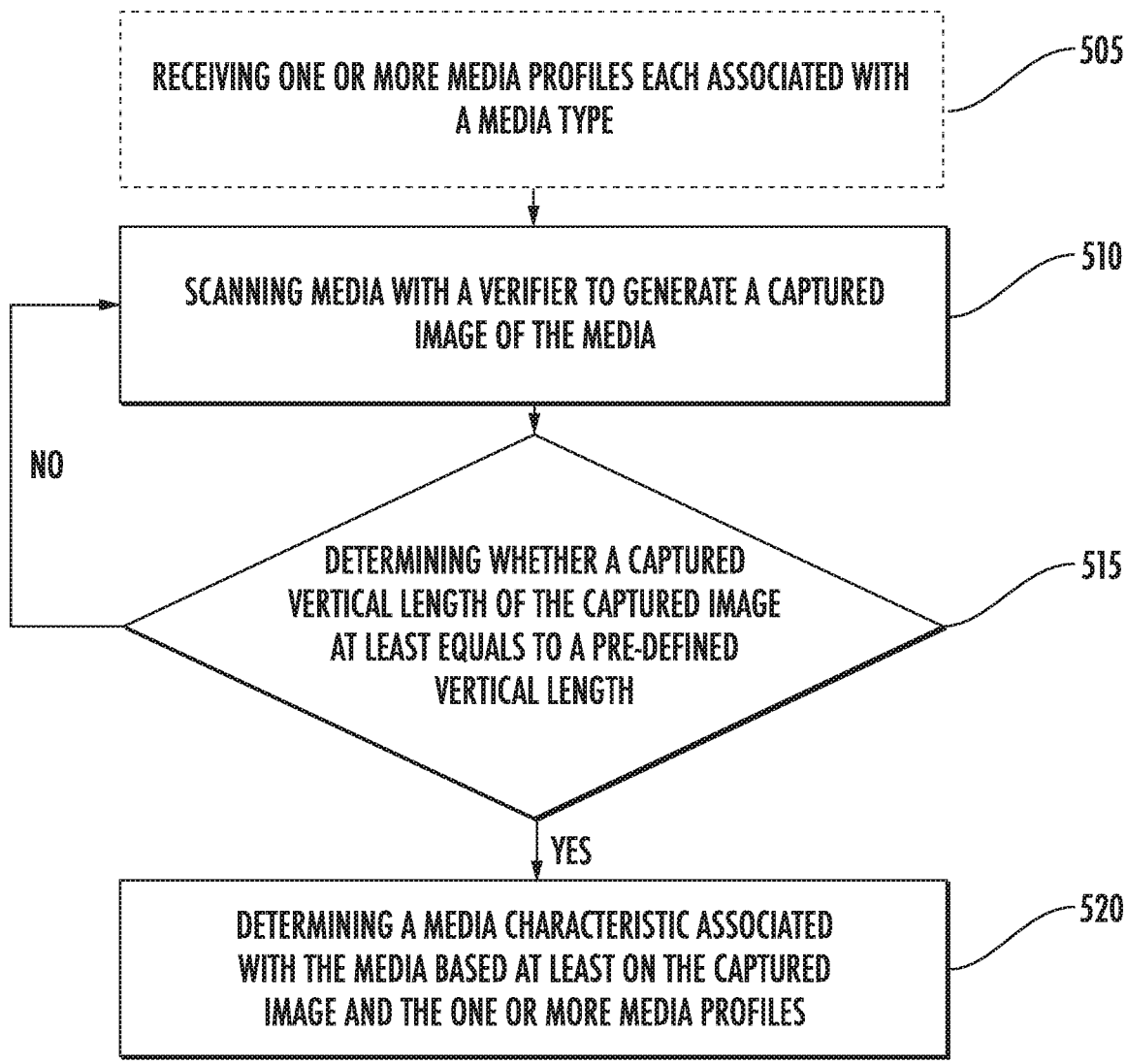
FIG. 5 is a flowchart of an exemplary method for determining media characteristic, such as media type, media size, or the like, of a media according to various embodiments of the present disclosure.

III. Example Method For Implementing Example Embodiments of the Present Disclosure FIG. 5 is a flowchart of an exemplary method 500 for determining media characteristic, such as media type, media size, or the like, of a media associated with a printer, such as printer 400 that employs a scanner 405 as described above. The method and flowchart highlight the main steps of an exemplary embodiment, details of which are further described in connection with FIGS. 8-11.

It will be understood that exemplary method 500 may performed by a hardware processor (such as processor 220, processor 404, verifier processor 310, or the like) of an exemplary printer, in conjunction with or controlled by suitable computer code which implements the method. The code may be encoded directly into either of the logic of processor 220, processor 404, or verifier processor 310, or may be stored as firmware in a static memory (such as static memory 406, static memory associated with verifier memory 314, static memory associated with memory 240 or the like), or may be part of device driver code stored (for example, volatile printer raster memory 408, verifier memory 314, memory 240, or the like). In an alternative embodiment, the method 500 may be performed in whole or in part by a hardware processor of an external computer which is linked to a printer by a suitable wired or wireless communications means.

Method 500 begins with step 505, where the printer receives or otherwise accesses one or more media profiles. In some embodiments, each of the one or more media profiles may be associated with a media type. The one or more media profiles may be stored in printer raster memory 408, static memory 406, or verifier memory 314. In some embodiments, the one or more media profiles may include a gap media type, a blackmark media type, and a continuous media type. Whereas in alternative or additional examples, the processor may generate a media profile in real-time and in semi-real time.

In some embodiments and in an instance in which media is scanned with a verifier, scanner, or the like, image characteristic values such as grayscale or color values may be stored. As such, in some examples, a gap media type may define at least one gap threshold. For example, if one or more image characteristic values associated with one or more sampled lines decrease by an amount that exceeds a threshold, a media associated with the one or more image characteristic values may be determined to be a gap media type. In some embodiments, a continuous media profile may define at least one continuous threshold. For example, if one or more image characteristic values associated with one or more sampled lines do not increase or decrease by an amount that exceeds a threshold, a media associated with the one or more image characteristic values may be determined to be a continuous media type. In some embodiments, a blackmark media profile may define at least one blackmark darkness threshold and a black mark size threshold. For example, if one or more image characteristic value graphs increase or decrease by more than the blackmark darkness threshold for more than a blackmark size threshold, a media associated with the one or more image characteristic values are determined to be blackmark media type. Additional details regarding the example media types are described with reference to FIG. 7.

In step 510 of method 500, a scanner 405 may scan a new sheet of media 401*a* to generate a captured image of the media. The captured image may be stored in printer raster memory 408. In some embodiments, the image scanner 405 is a line scanner that includes one or more line scanner sensors. In some embodiments, the line scanner sensor and/or the media physically moves during the scanning. The direction where the media moves may be defined as the vertical direction. In some embodiments, the captured image may be incrementally generated as the line scanner sensor and/or the media physically moves during the scanning. Additional details regarding scanning of the media 401*a* and generation of captured image are described in more detail with reference to FIG. 8.

In step 515 of method 500, method 500 determines whether a captured vertical length of the captured image at least equals to (e.g., equals to or exceeds) a pre-defined vertical length. In some embodiments, the pre-defined vertical length may be defined by the one or more media profiles. In some embodiments, if the method 500 determines that a captured vertical length of the captured image at least equals to the pre-defined vertical length, method 500 may proceed to step 520. In some embodiments, if the method 500 determines that a captured vertical length of the captured image is less than the pre-defined vertical length, method 500 may continue step 510 and continue scanning of the media. In some embodiments, vertical length of the captured image may be represented by a number of pixels in the vertical direction on the captured image. The number of the pixels may correspond with a physical vertical length based on a vertical movement speed of the media and a scan rate of the one or more line scanner sensors.

In step 520 of method 500, based on the detection of 515, upon determining that the captured vertical length of the captured image at least equals to the pre-defined vertical length, method 500 may determine a media characteristic, such as a media type, media horizontal width, or the like, associated with the media based at least on the captured image and the one or more media profiles. Additional details regarding determining a media type associated with the media are described in more detail with reference to FIG. 7. Additional details regarding determining a media horizontal width associated with the media are described in more detail with reference to FIG. 9.

In an embodiment, after determining the media type associated with the media, method 500 may end. In an embodiment, the printer 200 or 400 may generate and/or update one or more configurations for calibrating the printer based on the determined media characteristic associated with the media to be printed then proceed to print on the media. In some embodiments, the printer 200 or 400 may adjust one or more of components based on the determined media characteristic before printing on the media. For example, the printer 200 or 400 may adjust a label stop sensor position or a label stop position based on the determined media type.

In alternative embodiments consistent with the scope of the appended claims, some steps described above may be deleted or added, and some steps may be performed in a different order or manner.

Figure 6:
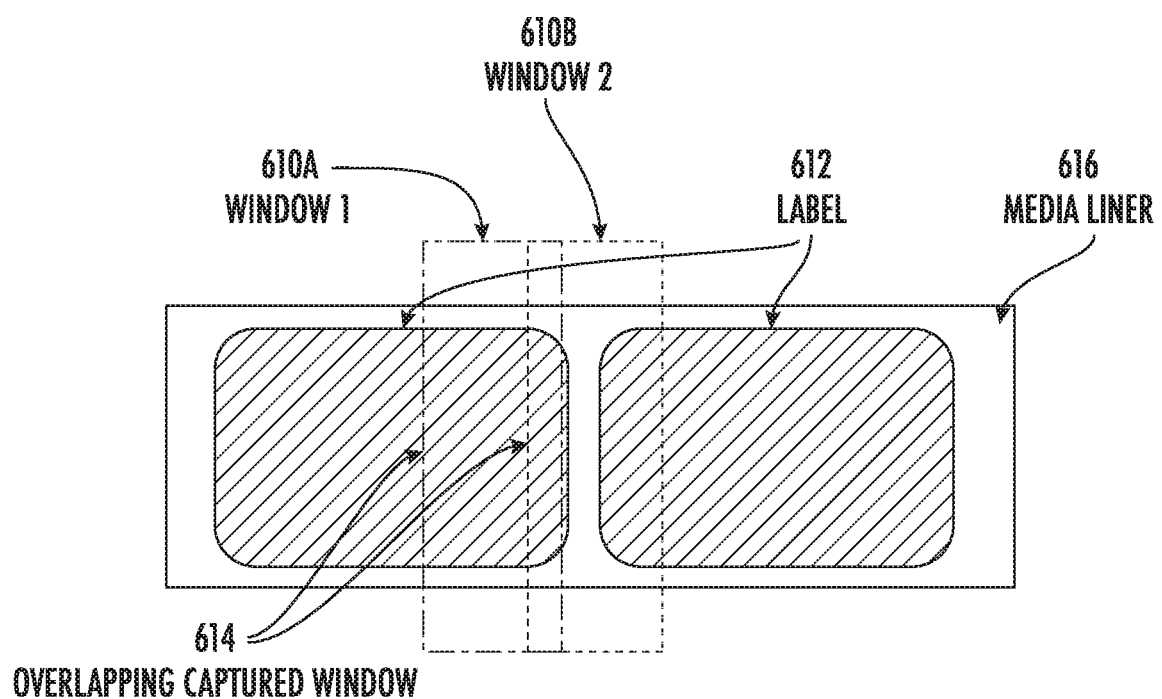
FIG. 6 illustrates an exemplary scan of a media and associated generation of a captured image of the media according to various embodiments of the present disclosure.

FIG. 6 illustrates an exemplary scan of a media and associated generation of a captured image of the media according to various embodiments of the present disclosure. The media may include, by way of example, label 612 and media liner 616. In some embodiments, a line scanner sensor embedded within the scanner 405 or the verifier 302 may be utilized. The line scanner sensor may capture two consecutive windows 610A and 610B in different times (e.g., 610A may be captured from 1 second to 4 seconds after initiation of scanning and 610B may be captured from 2 seconds to 5 seconds after initiation of scanning) by scanning a portion of the media. In some embodiments, the line scanner sensor may scan the same physical location with regard to the line scanner sensor; because the media is moving during the scanning, the two consecutive windows 610A and 610B captured in different times represent different portions of the media. In some embodiments, a captured image may be continuously generated while the line scanner sensors scan the media. In some embodiments, the captured image may include all output of the line scanner sensors while scanning the media. In some embodiments, the captured image may only include an overlapping captured window 614 of the two windows 610A and 610B.

In some embodiments, two line scanner sensors embedded within the scanner 405 may be utilized. Each line scanner sensor may be configured to scan a portion of the media, and each line scanner sensor may begin the scan in different starting physical locations (which may be pre-defined). The line scanner sensors may continuously scan the media while the media and/or the image scanner moves in the vertical direction. In some embodiments, the output of each line scanner sensor may be the window 610A or 610B associated with the line scanner sensor captured by each of the two line scanner sensors.

In some embodiments, the continuous generation of the captured image may stop after the vertical length of the captured image, which corresponds to the direction of movement of the media and/or the line scanner, at least equals to a pre-defined vertical length and/or a pre-defined horizontal width.

As described above and will be discussed in further details, the captured image may be analyzed against a media profile received by the printer. In some embodiments, the result of the analysis may be a determination of a media characteristic, such as media type, width, length, or the like, associated with the media.

Figure 7:
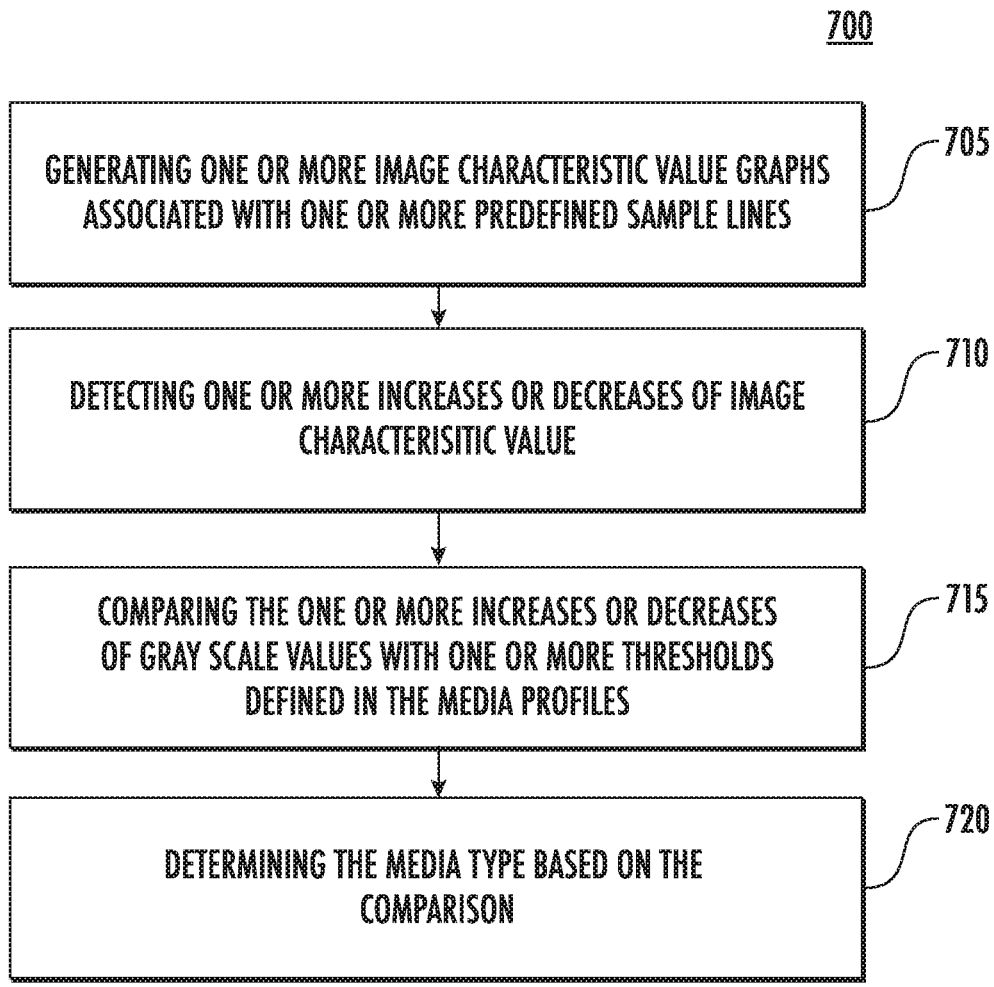
FIG. 7 is a flowchart illustrating additional details of an exemplary method for determining media type of a media type according to various embodiments of the present disclosure.

FIG. 7 is a flowchart of an exemplary method 700 illustrating additional details of an exemplary method for determining media type of a media according to various embodiments of the present disclosure.

Figure 8:
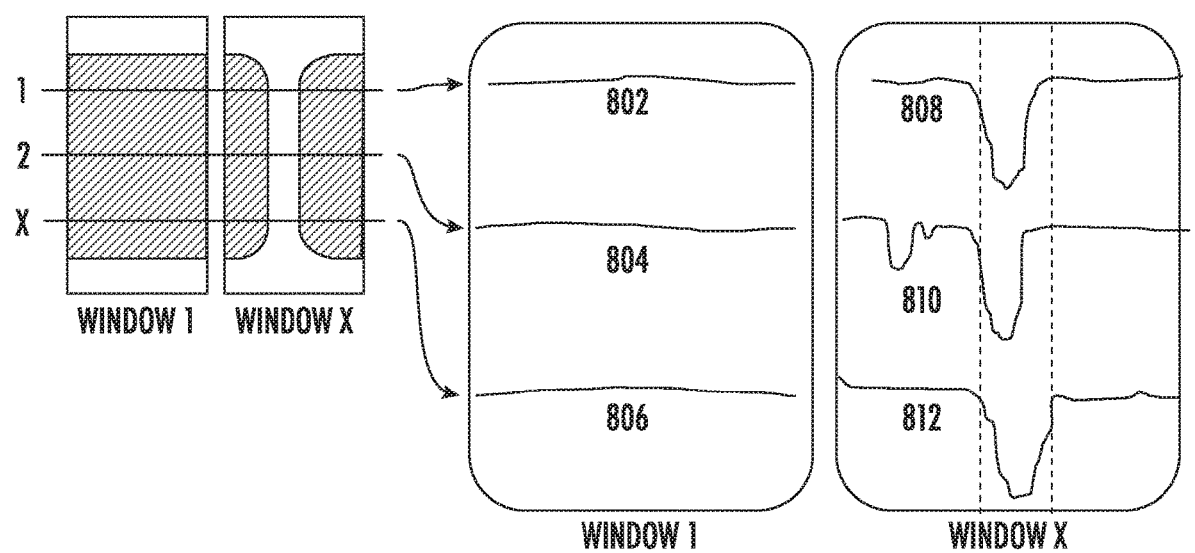
FIG. 8 illustrates several exemplary image characteristic value graphs generated based on captured image and illustrated vertical sample lines according to various embodiments of the present disclosure.

Method 700 begins with step 705, where the printer generates one or more image characteristic value graphs based on the captured image. Example image characteristic value graphs are illustrated in FIG. 8. An example image characteristic value graph may be in the form of a grayscale value graph, a color scale value graph, or the like. In some embodiments, the one or more image characteristic value graphs may be generated by using one or more pre-defined vertical sample lines 1, 2, and X associated with the captured image and extracting image characteristic values along each of the pre-defined vertical sample lines 1, 2, and X. As illustrated in FIG. 8, the one or more image characteristic value graphs 802, 804, 806, 808, 810, and 812 may each correspond to a particular window. In some embodiments, the vertical axis of the image characteristic value graphs represents bitmap image characteristic value and the horizontal axis of the image characteristic value graphs correspond to locations on the sample lines. In some embodiments, as the captured images are being continuous generated while the media moves in the vertical direction, the one or more image characteristic value graphs may be accordingly propagated horizontally.

In step 710 of method 700, method 700 identifies one or more increases or decreases of image characteristic value in the image characteristic value graphs. In some examples, an increase or decrease may be identified based on a change that exceeds a predetermined amount. Alternatively or additionally, a change may be identified based on a particular image characteristic value.

In step 715 of method 700, method 700 compares the one or more increases or decreases of image characteristic values with one or more thresholds defined in the media profiles. In step 720 of method 700, method 700 determines the media type of the media based on the comparison in step 715. Alternatively or additionally, an increase or decrease of image characteristic values may be identified and one or media profiles may be generated, based on pattern identification, machine learning and/or the like. Additional details regarding generation of media profiles are described in conjunction with FIG. 11.

For example, one or more decreases of image characteristic values in the one or more image characteristic value graphs may be compared with a gap threshold defined by a gap media profile previously received in step 505 of FIG. 5. If the one or more decreases of image characteristic values exceeds the gap threshold, method 700 may determine that the media is associated with the gap media type. If the one or more decreases of image characteristic values do not exceed the gap threshold, method 700 may determine that the media is not associated with the gap media type.

In some embodiments, decreases of image characteristic values exceeding the gap threshold may be required for one or more image characteristic value graphs for one particular window for the determination of gap media type.

In another example, one or more image characteristic values in the one or more image characteristic value graphs may be compared with a continuous threshold defined by a continuous media profile previously received in step 505 of FIG. 5. If the one or more image characteristic values in the one or more image characteristic value graphs do not increase or decrease by more than the continuous threshold, method 700 may determine that the media is associated with the continuous media type. In some embodiments, image characteristic values that do not increase or decrease by more than the continuous threshold may be required for all image characteristic value graphs for all capturing windows for the determination of continuous media type.

In another example, one or more image characteristic values in the one or more image characteristic value graphs may be compared with a blackmark darkness threshold defined by a blackmark media profile previously received in step 505 of FIG. 5. If the one or more image characteristic values in the one or more image characteristic value graphs do not increase or decrease by more than by more than the blackmark darkness threshold for a length defined by a blackmark size threshold. In some embodiments, the blackmark darkness and the blackmark size threshold are defined by the blackmark media profile, method 900 may determine that the media is associated with the blackmark media type.

Figure 9:
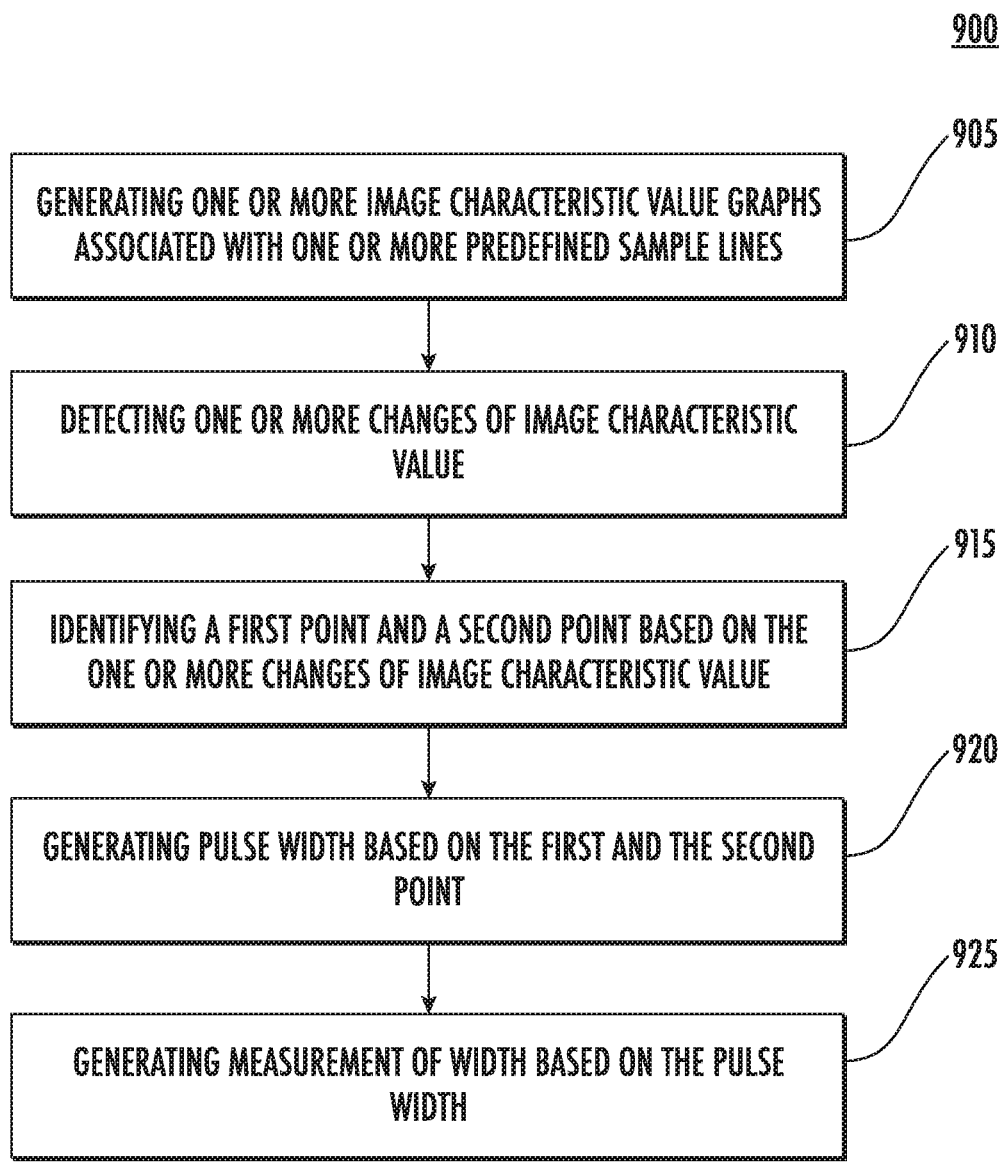
FIG. 9 is a flowchart illustrating additional details of an exemplary method for determining media horizontal width according to various embodiments of the present disclosure.
Figure 10:
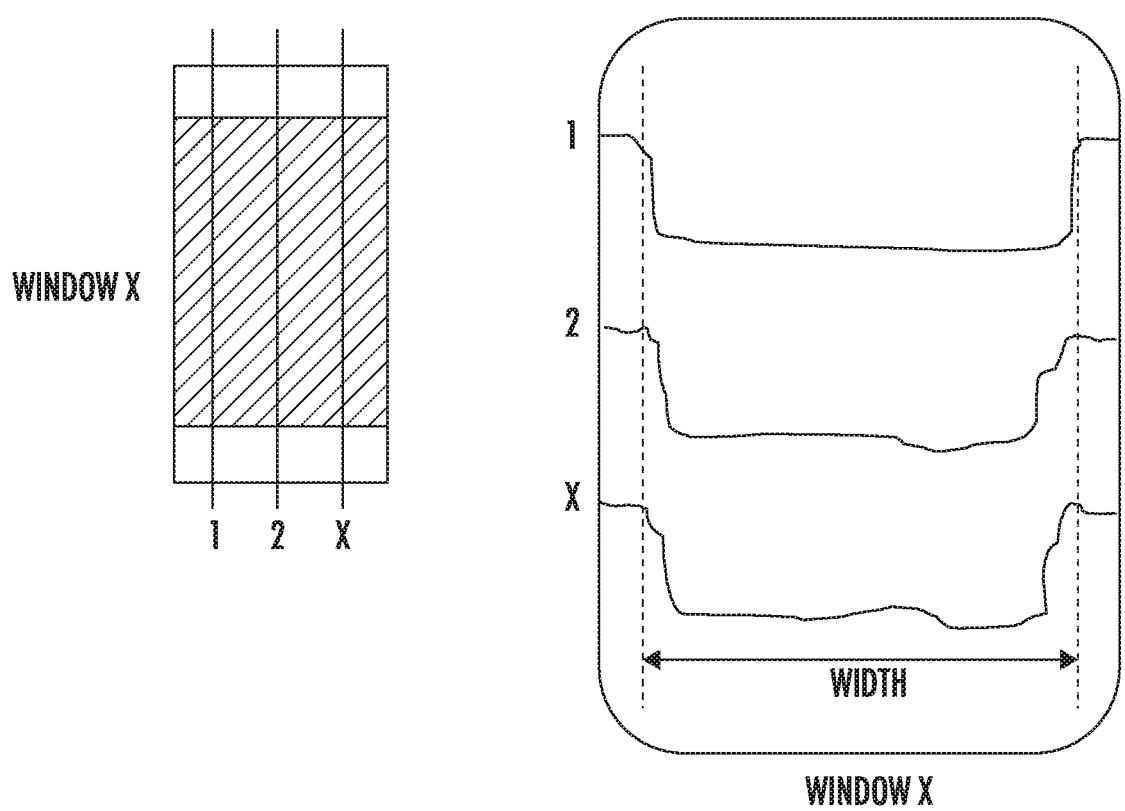
FIG. 10 illustrates several exemplary image characteristic value graphs generated based on captured image and illustrated horizontal sample lines according to various embodiments of the present disclosure.

FIG. 9 is a flowchart of an exemplary method 900 illustrating additional details for determining horizontal width of a media according to various embodiments of the present disclosure. As illustrated in FIG. 9, method 900 begins with step 905, where the printer generates one or more image characteristic value graphs based on the captured image. As illustrated in FIG. 10, the one or more image characteristic value graphs may be generated using one or more horizontal sample lines 1, 2, and X to sample on the captured image to determine width associated with the media. Similar to the image characteristic value graphs illustrated in FIG. 8, in some embodiments, the vertical axis of the image characteristic value graphs represents bitmap image characteristic value and the horizontal axis of the image characteristic value graphs correspond to locations on the sample lines. In some embodiments, a distance between two points in the horizontal axis of the image characteristic value graphs may be converted to a width in the physical world based on a scanning resolution indicated as a scanning dots per inch (DPI) that is pre-defined. Movement speed of media controlled by the one or more motors and a scan line frequency associated with the line scanner may control the scanning DPI.

For each of the image characteristic value graphs generated, in step 910 of method 900, method 900 detects one or more changes of image characteristic value that exceeds a threshold. In some embodiments, the threshold may be pre-defined.

In step 915 of method 900, method 900 identify a first point and a second point based on the identified changes of image characteristic value. In some embodiments, the first point is associated with a decrease of image characteristic value that exceeds the threshold. In some embodiments, the second point is associated with an increase of image characteristic value that exceeds the threshold.

In step 920 of method 900, method 900 generates a pulse width based on the distance between the first point and the second point. In some embodiments, pulse width is a width that corresponds with the distance between the first point and the second point. Steps 910 to 920 may be repeated for one or more image characteristic value graphs that correspond with one or more sample lines to generate one or more pulse widths.

In step 925 of method 900, method 900 generates measurement of width based on the one or more pulse widths. In some embodiments, method 900 generates measurement of width by averaging all the pulse widths generated. Alternatively or additionally, method 900 may generate measurement of width by assigning different sample lines different weights and may generate the measurement of width by generating a weighted average of the one or more pulse widths based on the assigned weights of sample lines associated with the one or more pulse widths.

Figure 11:
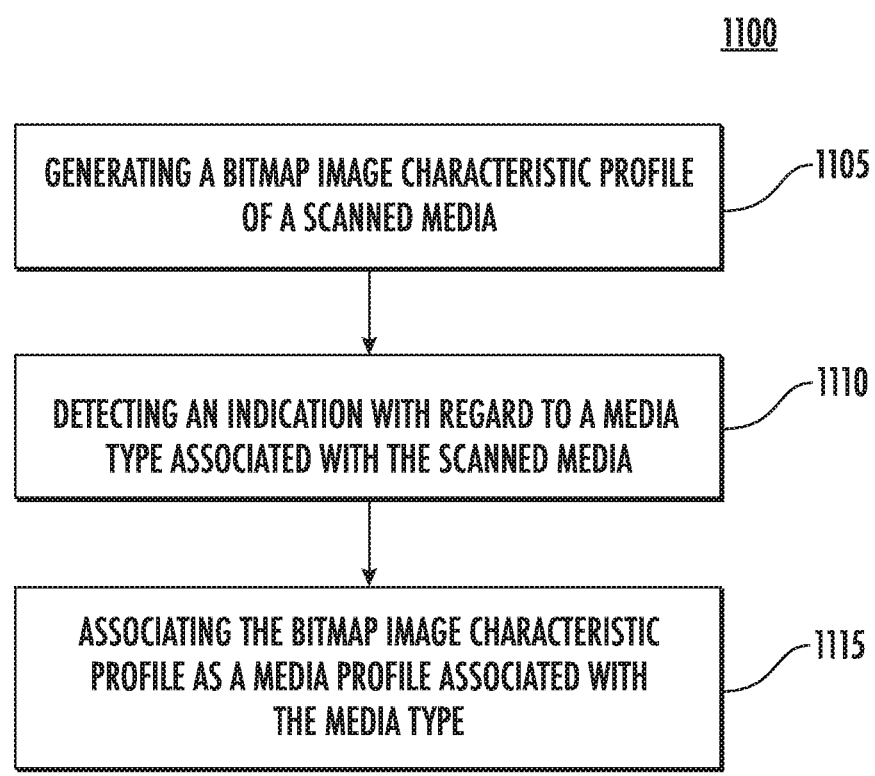
FIG. 11 is a flowchart illustrating additional details for generating media profiles according to various embodiments of the present disclosure.

FIG. 11 is a flowchart of an exemplary method 1100 illustrating additional details for generating media profiles according to various embodiments of the present disclosure.

Method 1100 begins with step 1105, where the printer generates a bitmap image characteristic profile based on a scanning of media. In some embodiments, the scanning of media may be the scanning previously described in conjunction with FIGS. 5 to 10. The bitmap image characteristic profile may include one or more image characteristic value graphs and one or more features generated based on the one or more image characteristic value graphs. The one or more features may include, by way of example, one or more detected changes in image characteristic values in one or more sample lines, one or more image characteristic value change thresholds calculated based on the one or more detected changes, one or more positional thresholds associated with physical distance represented by the one or more image characteristic value graphs, or the like.

In step 1110 of method 1100, the printer may detect an indication with regard to the media type associated with the scanned media. For example, the printer may receive an input associated with a manually adjusted position of a label stop sensor. The printer may be configured to correspond each possible position of the label stop sensor with a media type. Accordingly, after the printer receives the input associated with a manually adjusted position of a label stop sensor, the printer may identify the media type associated with the manually adjusted position. In another example, the printer may detect that the scanned media is associated with a particular media type after printing on the media type.

In step 1115 of method 1100, the printer may associate the bitmap image characteristic profile with the media type indicated by the indication in step 1110 and store the bitmap image characteristic profile as a media profile associated with the media type. In some embodiments, the bitmap image characteristic profile may include the one or more image characteristic value graphs and one or more features generated based on the one or more image characteristic value graphs. In some embodiments, more than one media profile may be associated with one media type.

IV. Additional Implementation Details

It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIG.

5 and FIG. 7, when executed, convert a computer or processing circuitry into a particular machine configured to perform an example embodiment of the present invention. Accordingly, the operations of FIG. 5 and FIG. 7 define an algorithm for configuring a computer or processor, to perform an example embodiment. In some cases, a general purpose computer may be provided with an instance of the processor which performs the algorithm of FIG. 5 and FIG. 7 to transform the general purpose computer into a particular machine configured to perform an example embodiment.

Accordingly, blocks/steps of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

In the specification and figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing detailed description has set forth various embodiments of the devices and/or processes via the use of block diagrams, flow charts, schematics, exemplary data structures, and examples. Insofar as such block diagrams, flow charts, schematics, exemplary data structures, and examples contain one or more functions and/or operations, each function and/or operation within such block diagrams, flowcharts, schematics, exemplary data structures, or examples can be implemented, individually and/or collectively, by a wide range of hardware, software, firmware, or virtually any combination thereof.

In one embodiment, the present subject matter may be implemented via Application Specific Integrated Circuits (ASICs). However, the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers), as one or more programs running on one or more processors (e.g., microprocessors), as firmware, or as virtually any combination thereof.

In addition, those skilled in the art will appreciate that the control mechanisms taught herein are capable of being distributed as a program product in a variety of tangible forms, and that an illustrative embodiment applies equally regardless of the particular type of tangible instruction bearing media used to actually carry out the distribution. Examples of tangible instruction bearing media include, but are not limited to, the following: recordable type media such as floppy disks, hard disk drives, CD ROMs, digital tape, flash drives, and computer memory.

The various embodiments described above can be combined to provide further embodiments. These and other changes can be made to the present systems and methods in light of the above-detailed description. Accordingly, the disclosure is not limited by the disclosure, but instead its scope is to be determined by the following claims.

The invention claimed is:

1. A method for determining a media type of a media associated with a printer, the method comprising:
    scanning a media associated with the printer to generate at least two consecutive windows of a media;
    determining a vertical length of a captured image based on a comparison of image characteristic values captured in the at least two consecutive windows;
    determining a media characteristic associated with the media based at least on the captured image and the vertical length and one or more stored media profiles; and
    calibrating the printer based on the media characteristic.

2. The method according to claim 1, wherein the media physically moves in a vertical direction during the scanning.

3. The method according to claim 1, wherein the scanning is associated with a pre-determined window size defined by a horizontal width and a vertical length, wherein the media characteristic further includes a width, and wherein the method further comprises:
    generating one or more image characteristic value graphs based on the captured image;
    detecting one or more changes of image characteristic value on the one or more image characteristic value graphs;
    for each image characteristic value graph:
        determining a first point and a second point based one or more changes of image characteristic values;
        determining a pulse width based on the distance between the first point and the second point; and
        determining the width based on the one or more pulse widths associated with each of the image characteristic value graphs.

4. The method according to claim 1, further comprising a line scanner sensor associated with a line scanner physically moves in a vertical direction during the scanning.

5. The method according to claim 1, wherein the captured image comprises one or more pre-defined vertical sample lines associated with a line scanner sensor associated with the line scanner.

6. The method according to claim 5, further comprising receiving one or more media profiles each associated with a media type, wherein the media characteristic includes a media type.

7. The method according to claim 6, wherein one media profile of the one or more media profiles is associated with a gap media type, and wherein determining that the media is associated with the gap media type comprises:
    generating one or more image characteristic value graphs associated with each of the one or more sample lines;
    detecting one or more decreases of image characteristic values in the one or more image characteristic value graphs that exceeds a gap threshold; and
    determining that the media is associated with the gap media type.

8. The method according to claim 6, wherein one media profile of the one or more media profiles is associated with a continuous media type, and wherein determining that the media is associated with the continuous media type comprises:
    generating one or more image characteristic value graphs associated with each of the one or more sample lines;
    detecting that one or more image characteristic values in the one or more image characteristic value graphs do not increase or decrease by more than a continuous threshold; and determining that the media is associated with the continuous media type.

9. The method according to claim 6, wherein one media profile of the one or more media profiles is associated with a blackmark media type, and wherein determining that the media is associated with the blackmark media type comprises:
generating one or more image characteristic value graphs associated with each of the one or more sample lines;
detecting that at least one image characteristic value in the one or more image characteristic value graphs increase or decrease by more than a blackmark darkness threshold for more than a blackmark size threshold; and
determining that the media is associated with the blackmark media type.

10. The method of claim 1, wherein the calibrating comprises adjusting a label stop position.

11. A printer comprising:
a line scanner configured to scan a media to generate at least two consecutive windows of a media; and
a device configured to:
determine a vertical length of a captured image based on a comparison of image characteristic values captured in the at least two consecutive windows;
determine a media characteristic associated with the media based at least on the captured image, the vertical length and the one or more media profiles; and
calibrate the printer based on the media characteristic.

12. The printer according to claim 11, wherein the media physically moves in a vertical direction during the scanning.

13. The printer according to claim 11, wherein the scanning is associated with a pre-determined window size defined by a horizontal width and a vertical length, wherein the media characteristic further includes a width, and wherein the device is further configured to:
generate one or more image characteristic value graphs based on the captured image;
detect one or more changes of image characteristic value on the one or more image characteristic value graphs;
for each image characteristic value graph:
determine a first point and a second point based one or more changes of image characteristic values;
determine a pulse width based on the distance between the first point and the second point; and
determine the width based on the one or more pulse widths associated with each of the image characteristic value graphs.

14. The printer according to claim 11, wherein a line scanner sensor associated with the line scanner physically moves in a vertical direction during the scanning.

15. The printer according to claim 11, wherein the device is further configured to receive one or more media profiles each associated with a media type, and wherein the media characteristic includes a media type.

16. The printer according to claim 15, wherein the captured image comprises two overlapping windows each associated with the pre-determined window size, and wherein the captured image comprises one or more pre-defined vertical sample lines associated with the line scanner sensor.

17. The printer according to claim 16, wherein one media profile of the one or more media profiles is associated with a gap media type, and wherein determining that the media is associated with the gap media type comprises:
generating one or more image characteristic value graphs associated with each of the one or more sample lines;
detecting one or more decreases of image characteristic values in the one or more image characteristic value graphs that exceeds a gap threshold; and
determining that the media is associated with the gap media type.

18. The printer according to claim 16, wherein one media profile of the one or more media profiles is associated with a continuous media type, and wherein determining that the media is associated with the continuous media type comprises:
generating one or more image characteristic value graphs associated with each of the one or more sample lines;
detecting that one or more image characteristic values in the one or more image characteristic value graphs do not increase or decrease by more than a continuous threshold; and
determining that the media is associated with the continuous media type.

19. The printer according to claim 16, wherein one media profile of the one or more media profiles is associated with a blackmark media type, and wherein determining that the media is associated with the blackmark media type comprises:
generating one or more image characteristic value graphs associated with each of the one or more sample lines;
detecting that at least one image characteristic value in the one or more image characteristic value graphs increase or decrease by more than a blackmark darkness threshold for more than a blackmark size threshold; and
determining that the media is associated with the blackmark media type.

20. The printer of claim 11, wherein the calibrating comprises adjusting a label stop position.

* * * * *